United States Patent [19]
Marus et al.

[11] 3,825,921
[45] July 23, 1974

[54] TRAILER POSITION INDICATOR
[75] Inventors: Louis J. Marus, 9151 River Bluff Rd., Millington; James D. Abernathy, Memphis, both of Tenn.
[73] Assignee: said Marus and Bogatin, by said Abernathy, a part interest to each
[22] Filed: Nov. 17, 1972
[21] Appl. No.: 307,475

[52] U.S. Cl............. 340/282, 340/196, 180/103, 280/477, 33/264, 336/122
[51] Int. Cl. ................................... G08b 21/00
[58] Field of Search......... 340/282, 52 R, 275, 196, 340/285; 180/103; 280/477; 33/264; 336/30, 115, 121, 122, 123

[56] References Cited
UNITED STATES PATENTS

| | | | |
|---|---|---|---|
| 2,221,516 | 11/1940 | Hathaway | 33/148 |
| 3,128,070 | 4/1964 | Harris, Jr. et al. | 340/196 UX |
| 3,426,588 | 2/1969 | Duda | 335/30 X |
| 3,509,469 | 4/1970 | Strange | 340/196 X |
| 3,605,088 | 9/1971 | Saxelli | 340/70 |
| 3,701,136 | 10/1972 | Stevens et al. | 336/30 X |

Primary Examiner—John W. Caldwell
Assistant Examiner—William M. Wannisky
Attorney, Agent, or Firm—Ralph W. Kalish

[57] ABSTRACT

A system for indicating to an operator of a towing vehicle the relative disposition of a towed trailer, comprising an emitter provided on said towing vehicle, a coil mounted upon the trailer for induction of a current therein, the strength of which current will depend upon the relative positioning of said emitter and said coil, an instrument provided in said towing vehicle for indicating the strength of the induced current and being connected to said coil, and a source of alternating current connected to said emitter.

6 Claims, 3 Drawing Figures

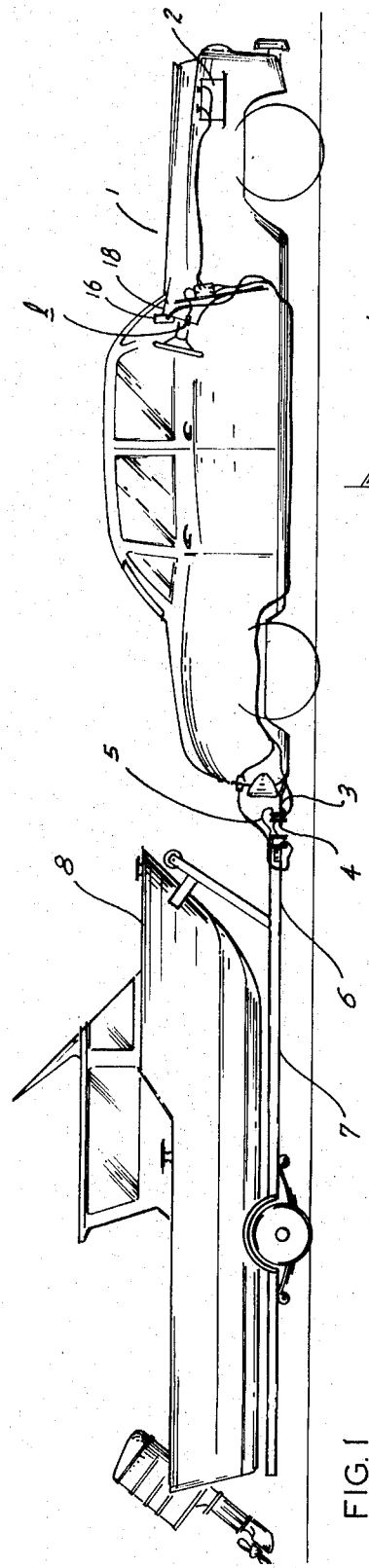
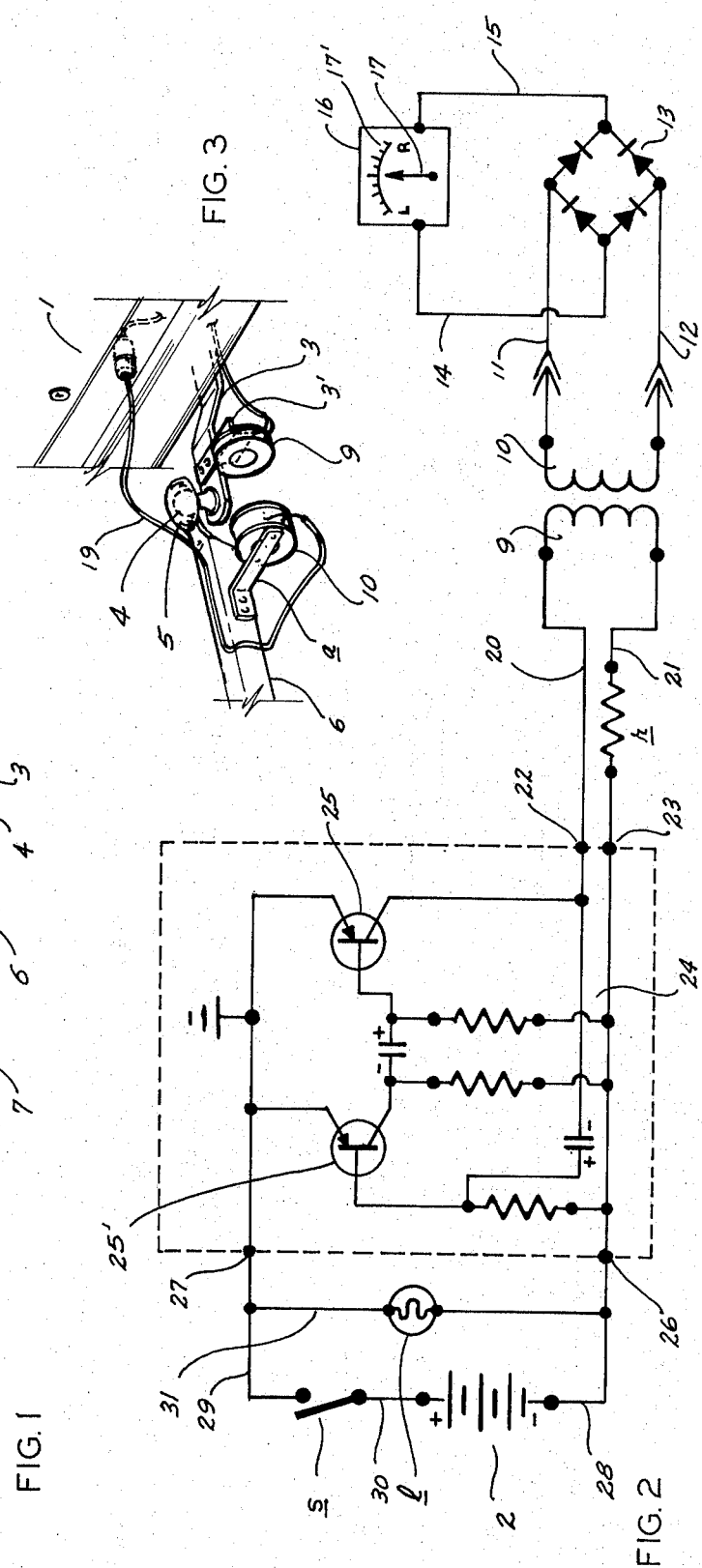

TRAILER POSITION INDICATOR

BACKGROUND AND SUMMARY OF THE INVENTION

This invention relates in general to trailers, and, more particularly, to an indicator for informing the operator of a towing vehicle of the relative angular relationship between such vehicle and the trailer.

Heretofore numerous efforts have been undertaken to develop a means for indicating to a towing vehicle operator the relative position of the towed vehicle without resort to the services of an observer, or without the need for relatively constant direct viewing. However, such efforts have not proved efficacious primarily through a lack of simplicity, as well as reliability. For the most part prior unsatisfactory efforts have been either of mechanical or electro-mechanical character comprehending a multiplicity of components conducing to complexity in arrangement with attendant difficulties in installation and uncertainties in operation.

Accordingly, it is an object of the present invention to provide a trailer position indicator which is fundamentally of electrical character so as to be devoid of mechanical components, thereby conducing to both reliability in operation as well as to resistance to breakdown.

It is another object of the present invention to provide a trailer position indicator which may be most easily installed upon existing vehicles and associated trailers without the need for costly modification.

It is another object of the present invention to provide a trailer position indicator which obviates the necessity of the operator or an assistant from directly viewing the relative position of the vehicle being towed, necessitating merely an observation of an indicating face located conveniently within the towed vehicle so that the operator may promptly effect requisite maneuvering for restoring, or maintaining, the trailer in properly aligned condition. Thus, under difficult road or weather conditions, the operator of the towing vehicle may be at all times fully informed as to the relative position of the particular trailer by mere glancing at the indicator.

It is a still further object of the present invention to provide a trailer position indicator which is of marked sensitivity so that slight swinging of the trailer from axially aligned relationship with respect to the towing vehicle is detectable thereby permitting the operator to control the trailer and obviate the potential for more strenuous countermeasures.

It is another object of the present invention to provide a trailer position indicator which is most economical in construction; and which is durable in operation.

BRIEF DESCRIPTION OF THE DRAWINGS

FIG. 1 is a side elevational view of a towing vehicle and a trailer hitch thereto equipped with a trailer position indicator constructed in accordance with and embodying the present invention.

FIG. 2 is a wiring diagram.

FIG. 3 is a perspective view illustrating the disposition of the emitter coil in operative position upon a towing vehicle and a trailer.

DESCRIPTION OF THE PREFERRED EMBODIMENT

Referring now by reference numerals to the drawings which illustrate the preferred embodiment of the present invention, 1 indicates a towing vehicle as of the pleasure type having the customary direct current battery 2 as of the 12 volt character, and having a hitch support 3 carrying a hitch 4, as of the ball type, for coupling relationship with a complementary member, such as a socket element 5, disposed at the forward end of the frame 6 of a trailer 7 as of the type for hauling a boat 8.

Fixed upon vehicle hitch support 3, as by means of a suitable dielectric mounting 3' adjacent member 4, is a transmitting coil, or so-called emitter 9, in normal face to face relationship with an induction coil 10, carried by an insulated arm $a$ upon frame 6 of trailer 7, as at a point proximate, but lateral of, complementary hitch member 5 so that spacing between emitter 9 and induction coil 10 may be appropriate for facile development of a current within induction coil 10 as will be shown more fully hereinbelow. I.e., said coils are inductively coupled. It is to be particularly noted that emitter 9 and induction coil 10 are located on an axis parallel to, but spaced from, the longitudinal axis of towing vehicle 1 and trailer 7 when the same are aligned. Said induction coil 10 is connected by leads 11,12 to a full wave rectifier bridge or converter 13 which latter is in turn connected by leads 14,15 to opposite sides of the coil (not shown) of a current measuring instrument or ammeter 16 having the customary pointer 17 and an associated graduated scale 17'. Instrument 16 is disposed within the vehicle 1 as upon the dashboard 18 thereof for convenient reference by the operator. Thus, leads 11,12 may be suitable provided within a cable, as indicated 19, for extension along hitch support 3 and the body of vehicle 1 with converter 13 thus being protectedly disposed within vehicle 1.

Emitter 9 is connected by conductors 20,21 to the output terminals 22,23, respectively, of a multivibrator 24; there being a feed-through resistor $r$ in conductor 21 between output terminal 23 and emitter 9; said multivibrator 24 is of the oscillator type and being of conventional solid state design incorporating the usual pair of transistors 25,25' with customary associated circuitry. Multivibrator 24 has a pair of input terminals 26,27, the former being connected by a lead 28 to one side of battery 2 and the other being connected by a conductor 29 to one side of a control switch $s$. Said switch $s$ and battery 2 are connected by a lead 30 for completing the circuit. Connected between lead 28 and conductor 29, in parallel relation to battery 2 is a lead 31 within which is disposed a lamp $l$. It will thus be seen that upon closing of switch $s$ d.c. voltage will be provided across input terminals 26,27 of multivibrator 24 with the same thereby converting the direct current to alternating current which is produced between its output terminals 22,23, being as of square wave form and thus energizing emitter 9 for establishing a field strength of sufficient extent for inducing a current within coil 10 with the same being converted to direct current by bridge 13 for measurement by dial 16 which, in effect, is a microammeter.

In actual practice it is, of course, requisite that multivibrator 24 provide a current with a sufficiently low frequency so as to avoid interference with any radio within vehicle 1, and also high enough to assure of suitable electromagnetic coupling of emitter 9 and coil 10 in view of the intervening atmosphere. Understandably, the higher the frequency the more effective the coupling, but it has been found that a frequency of 6,000 hz. has proved adequate for practical spacing, such as in the order of 6 inches. However, it is to be understood that the spacing can be readily determined by any one skilled in the art based upon the number of turns in the coils 9,10 and the transmitting frequency with the strength of the resultant current. It is, of course, apparent that such frequency should be constant in order that the emissions from emitter coil 9 will produce a constant field.

As pointed out above, emitter coil 9 and induction coil 10 are located on an axis parallel to the longitudinal axis of vehicle 1 and trailer 7 being laterally spaced therefrom. When vehicle 1 and trailer 7 are disposed in coaxial relationship, coils 9 and 10 will be in confronting planar parallel relationship as illustrated in FIG. 3 so that coil 10 will cut the lines of electromagnetic force in the field created by the transmissions of emitter 9. Instrument 16 may be calibrated so that pointer 17 will be at the center of scale 17' when said coils 9,10 are in planar parallel relationship (as shown in FIG. 2), i.e., are coaxially aligned.

If during travel trailer 7 were to slightly swing or veer out of longitudinal coaxial relationship with towing vehicle 1, induction coil 10 would be commensurately swung and thus cause a relative increase in the number of lines of electromagnetic force cut in the emitter field thereupon effecting a corresponding reduction or increase in the induced current with pointer 17 being deflected from its normally center position to the right or to the left as the case may be. With coils 9 and 10 presented, as shown in FIG. 3, so that the same are to the right hand side of the towing vehicle, longitudinal axis as viewed forwardly thereof, swinging of trailer 7 toward the right hand side of vehicle 1 will thus cause coils 9 and 10 to be moved closer together causing an increase in the number of lines of electromagnetic force cut by coil 10 in the emitted field (i.e., increasing the inductive coupling) thereby resulting in pointer 17 moving to the right hand end of scale 17', indicating such increase and simultaneously alerting the vehicle operator to the relative position of trailer 7. Correspondingly, if trailer 7 were to veer to the left from axially aligned condition with vehicle 1, coils 9 and 10 would be caused to move away from each other (decreasing the coupling) so that a relatively lesser number of lines of electromagnetic force would be cut by coil 10 within the emitted field resulting in relative decrease in the induced current so that pointer 17 would thus swing to the left of scale 17' and thereby indicate to the driver the relative disposition of trailer 7.

Obviously, if coils 9 and 10 were located on the opposite side of the longitudinal axis, from that depicted in FIG. 3, a mere reversal in relationship would result. But the critical factor is that the coils are so located that swinging of trailer 7 in one direction will increase the induced current (and hence the rectifier bridge output signal) and swinging in the other will reduce same.

As indicated in FIG. 2, lamp *l* is used to indicate the operational condition of the system so that when the same is illuminated the operator is assured of the working condition of the system.

In view of the foregoing, it is apparent that multivibrator 24 changes the direct current from battery 2 to alternating current requisite for producing the output at emitter 9 for inducing the signal-producing current in induction coil 10 which induced current is converted to direct current by bridge 13 which converts the alternating current to direct current for application to instrument 16. Thus, in the present instance, instrument 16 is a direct current ammeter and consequently provides the desired sensitivity for indicating purposes with signals which may be relatively small.

It is to be recognized that the particular form of coils 9,10 is dictated solely for illustrative purposes. It is to be recognized that said coils may be of varying size and configuration; may be suitably enclosed in weather-protecting housings and mounted in other manners than as shown. All such variations would be well within the capacity of one having skill in the art and thus the precise manner of presentation of such coils is not in any way intended to be restricted.

Having described our invention, what we claim and desire to obtain by Letters Patent is:

1. A trailer position indicator system for indicating the angular position of a trailer with respect to a towing vehicle to which said trailer is coupled in swinging relationship to said towing vehicle, said system comprising a first coil carried by said towing vehicle, a second coil carried by said trailing vehicle, said coils being inductively coupled, means for positioning said coils with respect to each other such that the inductive coupling between said coils is increased when said trailer swings toward one side of said towing vehicle and is decreased when said trailer swings toward the opposite side of said towing vehicle, means for energizing one of said coils with an alternating current (a.c.) signal, detector means interconnected with the other of said coils for detecting the a.c. signal inductively coupled from the energized coil to the other coil, and indicator means interconnected with said detector means and operative to provide indication of relative increase in the detected inductively coupled a.c. signal, thereby to indicate swinging of the trailer from axial alignment toward said one side of the towing vehicle, and said indicator means being operative to provide indication of relative decrease in the detected inductively coupled a.c. signal, thereby to indicate swinging of the trailer from axial alignment toward said opposite side of the towing vehicle.

2. A trailer position indicator system as set forth in claim 1 wherein said trailer and said towing vehicle are coupled by coupling means, said coils each being spaced laterally with respect to said coupling means and each being located to the same side of said coupling means.

3. A trailer position indicator system as set forth in claim 2 wherein said coupling means comprises a first hitch element extending from the rear of said towing vehicle and a second hitch element extending from the front of said trailer, one of said coils being carried by said first hitch element laterally and to one side thereof, the other of said coils being carried by said second hitch element laterally and to the same side thereof.

4. A trailer position indicator system as set forth in claim 3 wherein said first and second hitch elements are positioned along the respective longitudinal axes of the towing vehicle and the trailer, said coils being coaxially aligned when the respective longitudinal axes of the towing vehicle and the trailer are coaxially aligned.

5. A trailer position indicator system as set forth in claim 1 wherein said detector means comprises a bridge rectifier for providing a d.c. signal the magnitude of which is a function of the proximity of said coils, the proximity of said coils increasing to increase the inductive coupling between said coils upon swinging of the trailer laterally from axial alignment toward said one side of the towing vehicle, the proximity of said coils decreasing to decrease the inductive coupling between said coils upon swinging of the trailer laterally from axial alignment toward said opposite side of the towing vehicle, whereby the magnitude of said d.c. signal increases upon swinging of the trailer to said one side and decreases upon swinging of the trailer to said opposite side.

6. A trailer position indicator system as set forth in claim 5 wherein said indicator means comprises a meter interconnected with said bridge rectifier, said meter having a pointer and scale, said meter being calibrated such that the pointer is at the midpoint of the scale when the trailer and towing vehicle are axially aligned, the meter pointer moving from the midpoint toward one side of the scale to indicate swinging of the trailer from axial alignment toward one side of the vehicle and the pointer moving from the midpoint toward the other side of the scale to indicate swinging of the trailer from axial alignment toward the opposite side of the vehicle.

* * * * *